United States Patent Office 2,957,012
Patented Oct. 18, 1960

2,957,012

SUBSTITUTED BENZENESULFONYL-HYDRAZONES (A)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,831

1 Claim. (Cl. 260—397.7)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display anti-bacterial activity.

It is, therefore, an important object of the instant invention to provide new and useful substituted benzenesulfonylhydrazones.

It is another object of the instant invention to provide new and useful p-acetamidobenzenesulfonylhydrazones of certain higher aliphatic aldehydes or ketones.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound having the formula:

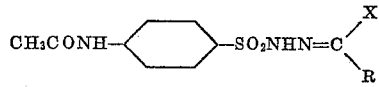

wherein X is selected from the class consisting of H and a $C_1$–$C_6$ aliphatic group and R is a $C_3$–$C_{17}$ aliphatic group.

As indicated, X is H or a monovalent aliphatic group having one to six carbon atoms, which may be a saturated or unsaturated straight chain or branched chain hydrocarbon group, such as methyl, ethyl, vinyl, propyl, isopropyl, allyl, n-butyl, isobutyl, sec.-butyl, tert.-butyl, crotyl, amyl, isoamyl, etc., n-hexyl, isohexyl . . ., hexenyl, etc. Preferably, X is H or a $C_1$–$C_4$ alkyl group.

The radical R is a monovalent aliphatic group having three to seventeen carbon atoms, which may be a saturated or unsaturated straight chain or branched chain hydrocarbon group, such as propyl, isopropyl, allyl, n-butyl, isobutyl, sec.-butyl, tert.-butyl, crotyl, amyl, isoamyl . . ., hexyl . . ., hexenyl, heptyl, heptenyl, octyl, octenyl, nonyl, nonenyl, decyl, dodecyl, tetradecyl, hexadecyl, octadecyl, octadecenyl, etc. Preferably, R is a $C_4$–$C_{10}$ radical containing not more than two olefinic unsaturations; and the total of carbon atoms in R and X is preferably not more than 10.

Typical compounds of the invention include:

p-Acetamidobenzenesulfonylhydrazone of butyraldehyde

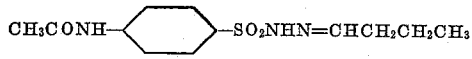

p-Acetamidobenzenesulfonylhydrazone of n-pentanal

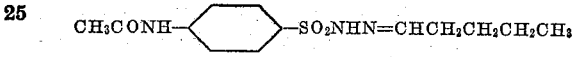

p-Acetamidobenzenesulfonylhydrazone of n-hexanal

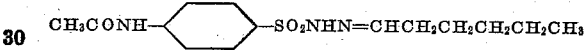

p-Acetamidobenzenesulfonylhydrazone of pinacolone

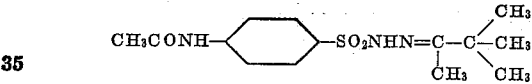

p-Acetamidobenzenesulfonylhydrazone of mesityl oxide

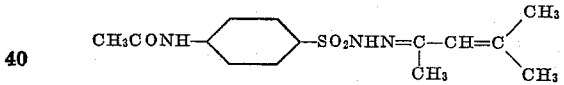

p-Acetamidobenzenesulfonylhydrazone of n-heptanal

p-Acetamidobenzenesulfonylhydrazone of 2-heptanone

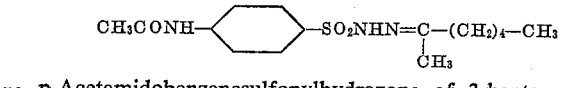

p-Acetamidobenzenesulfonylhydrazone of 3-heptanone

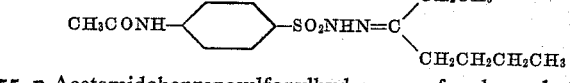

p-Acetamidobenzenesulfonylhydrazone of n-decanal

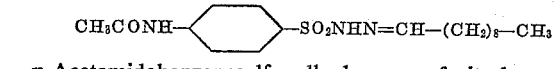

p-Acetamidobenzenesulfonylhydrazone of citral

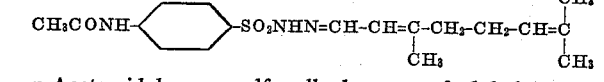

p-Acetamidobenzenesulfonylhydrazone of 6-dodecanone

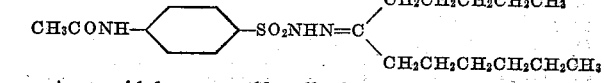

p-Acetamidobenzenesulfonylhydrazone of n-octadecanal

The compounds of the instant invention are prepared by reacting the aldehyde or ketone with p-acetamidobenzenesulfonylhydrazine. The reaction is carried out advantageously in a solvent. The solvents preferably used are water, alcohol, dioxane, or mixtures of these. The p-acetamidobenzenesulfonylhydrazine is relatively insoluble in the solvents; and the reaction is facilitated by the application of external heat. The hydrazine is first placed in the solvent and heat is applied; then substantially an equal molar quantity of the aldehyde or ketone is added, a small amount at a time with stirring, until the reaction is completed, as evidenced by a homogeneous appearance of the reaction mixture. The entire reaction period is but a few minutes (for example, 5 to 10 minutes). The product separates from the reaction mixture on cooling to room temperature and the product may be re-crystallized from alcohol, water, dioxane or a mixture thereof, to yield a relatively pure product.

Example 1 p-Acetamidobenzenesulfonylhydrazine (0.04 mol) is dissolved in a mixture of 100 ml. of methanol and 100 ml. of hot water (at 70° C.). Butyraldehyde (0.04 mol) is added to the hot solution, with vigorous stirring, and such stirring is continued as the solution cools to room temperature. During this cooling period, colorless crystals begin separating from this reaction mixture. After two hours, the crystals are collected on a suction filter and dried in an oven at 95° C. The product is re-crystallized from a mixture of three parts of methanol and two parts of water, to yield a substantially pure product in the form of white crystals which melt with decomposition at 122–123° C. Analysis for p-acetamidobenzenesulfonylhydrazone of butyraldehyde: Calculated for $C_{12}H_{17}N_3O_3S$ is C=50.87, H=6.05, N=14.83; and found, C=50.99, H=6.18, N=14.70.

Example 2

A procedure that is the same as that of Example 1 is carried out using isovaleraldehyde in place of the butyraldehyde and the result is a white crystalline product having a melting point of 132–133° C. Analysis for p-acetamidobenzenesulfonylhydrazone of isovaleraldehyde: Calculated for $C_{13}H_{19}N_3O_3S$ is C=52.50, H=6.44, N=14.13; and found, C=52.66, H=6.57, N=14.31.

Example 3

A procedure is carried out that is the same as that of Example 1, except that n-hexanal is employed instead of the butyraldehyde and the resulting product is a white amorphous product having a melting point of 115.5–116.7° C. Analysis for p-acetamidobenzenesulfonylhydrazone of n-hexanal: Calculated for $C_{14}H_{21}N_3O_3S$ is C=54.00, H=6.80, N=13.49; and found, C=54.22, H=6.69, N=13.30.

Example 4

A procedure is carried out that is the same as that described in Example 1 except that pinacolone is used in place of the butyraldehyde and the result is a white crystalline product having a melting point of 228–228.5° C. Analysis for p-acetamidobenzenesulfonylhydrazone of pinacolone: Calculated for $C_{14}H_{21}N_3O_3S$ is C=54.00, H=6.80; and found, C=54.18, H=6.93.

Example 5

A procedure is carried out that is the same as that described in Example 1 except that mesityl oxide is used in place of the butyraldehyde and the result is a white crystalline product having a melting point of 157–158° C. Analysis for p-acetamidobenzenesulfonylhydrazone of mesityl oxide: Calculated for $C_{14}H_{19}N_3O_3S$ is C=54.34, H=6.19, N=13.58; and found, C=54.35, H=6.14, N=13.65.

Example 6

A procedure is carried out that is the same as that described in Example 1 except that n-heptanal is used in place of the butyraldehyde and the resulting product is a white amorphous material having a melting point of 106.5–107.5° C. Analysis for p-acetamidobenzenesulfonylhydrazone of n-heptanal: Calculated for $$C_{15}H_{23}N_3O_3S$$

is C=55.36, H=7.12, N=12.91; and found, C=55.66, H=6.91, N=12.86.

Example 7

A procedure is carried out that is the same as that described in Example 1 except that 2-heptanone is used in place of the butyraldehyde and the result is a white crystalline product having a melting point of 158.5–159° C. Analysis for p-acetamidobenzenesulfonylhydrazone of 2-heptanone: Calculated for $C_{15}H_{23}N_3O_3S$ is C=55.36, H=7.12; and found, C=55.07, H=7.20.

Example 8

A procedure is carried out that is the same as that described in Example 1 except that 3-heptanone is used in place of the butyraldehyde and the result is a white crystalline product having a melting point of 159–160° C. Analysis for p-acetamidobenzenesulfonylhydrazone of 3-heptanone: Calculated for $C_{15}H_{23}N_3O_3S$ is C=55.36, H=7.12, N=12.91; and found, C=55.59, H=7.14, N=12.98.

Example 9

A procedure is carried out that is the same as that described in Example 1 except that citral is used in place of the buytraldehyde and the result is a white crystalline product having a melting point of 137.5–139° C. Analysis for p-acetamidobenzenesulfonylhydrazone of citral: Calculated for $C_{18}H_{25}N_3O_3S$ is C=59.48, H=6.93; and found, C=59.25, H=7.03.

The compounds of the invention just described show peak absorptions of light radiation in the neighborhood of 2970 A. and low absorption of light radiation in the neighborhood of 3400 A., so that they may be used in sun tan lotions. The compounds also undergo decomposition upon melting; and, with respect to anti-bacterial activity, p-acetamidobenzenesulfonylhydrazone of citral is exceptionally effective against *Escherichia coli*; and p-acetamidobenzenesulfonylhydrazone of n-hexanal is effective against the *Streptococcus pyogenes*.

It will be understood that modifications and variations may be effected without departing from the spirit and scope of the novel concepts of the present invention.

I claim as my invention:

p-Acetamidobenzenesulfonylhydrazone of n-hexanal.

References Cited in the file of this patent

UNITED STATES PATENTS 2,912,445   Zimmer _____ Nov. 10, 1959

OTHER REFERENCES

Lehmann et al.: Bull. Soc. Chem. Belges, vol. 55, pp. 66–68; 83; 85; 90–91 and 94–95 (1946).

Cheronis et al.: Semimicro Qualitative Organic Analysis, pp. 179–180, Thomas Y. Crowell Co. (1947).

Chemical Abstracts, vol. 41, pp. 5475–5477 (1947) [Abstract of Lehmann et al., Bull. Soc. Chem. Belges, vol. 55, pp. 52–97 (1946)].

Curtius et al.: J. Prakt. Chem., vol. 112, pp. 118–119; 127–128 (1927).